US012663885B2

(12) United States Patent
Pan

(10) Patent No.: US 12,663,885 B2
(45) Date of Patent: Jun. 23, 2026

(54) METHOD FOR PROVIDING INPUT EVENT TO VIRTUAL OBJECT, HOST, AND COMPUTER READABLE STORAGE MEDIUM

(71) Applicant: HTC Corporation, Taoyuan City (TW)

(72) Inventor: Sheng-Yang Pan, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 64 days.

(21) Appl. No.: 18/755,711

(22) Filed: Jun. 27, 2024

(65) Prior Publication Data

US 2025/0199632 A1     Jun. 19, 2025

Related U.S. Application Data

(60) Provisional application No. 63/610,405, filed on Dec. 15, 2023.

(51) Int. Cl.
| | |
|---|---|
| *G06F 3/038* | (2013.01) |
| *G06F 3/02* | (2006.01) |
| *G06F 3/0338* | (2013.01) |

(52) U.S. Cl.
CPC ............ *G06F 3/038* (2013.01); *G06F 3/0202* (2013.01); *G06F 3/0338* (2013.01)

(58) Field of Classification Search
CPC ...... G06F 3/038; G06F 3/0202; G06F 3/0338; G06F 3/017; G06F 3/0346; G06F 3/011
See application file for complete search history.

(56) References Cited

U.S. PATENT DOCUMENTS

| | | | |
|---|---|---|---|
| 10,327,089 B2 | 6/2019 | Foss et al. | |
| 2018/0239515 A1 | 8/2018 | Cooper et al. | |
| 2023/0259215 A1 | 8/2023 | Fashimpaur et al. | |
| 2023/0384907 A1 * | 11/2023 | Boesel ................... | G06F 3/012 |

FOREIGN PATENT DOCUMENTS

| | | |
|---|---|---|
| CN | 107995964 | 5/2018 |
| CN | 115657844 | 1/2023 |
| CN | 116414223 | 7/2023 |
| TW | I757871 | 3/2022 |

OTHER PUBLICATIONS

"Search Report of Europe Counterpart Application", issued on Feb. 11, 2025, p. 1-p. 5.
"Office Action of Taiwan Counterpart Application", issued on Jan. 10, 2025, p. 1-p. 10.

* cited by examiner

*Primary Examiner* — Jonathan A Boyd
(74) *Attorney, Agent, or Firm* — JCIPRNET

(57) ABSTRACT
The embodiments of the disclosure provide a method for providing an input event to a virtual object, a host, and a computer readable storage medium. The method includes: displaying a first virtual object in a virtual world, wherein the first virtual object includes a plurality of coordinates; obtaining at least one mapping relationship between control events of an input object and the plurality of coordinates on the first virtual object; receiving a control event from the input object; determining a first target coordinate, among the plurality of coordinates, corresponding to the control event based on the at least one mapping relationship, and providing a first input event to the first virtual object based on the first target coordinate, wherein the first input event corresponds to the control event from the input object.

20 Claims, 8 Drawing Sheets

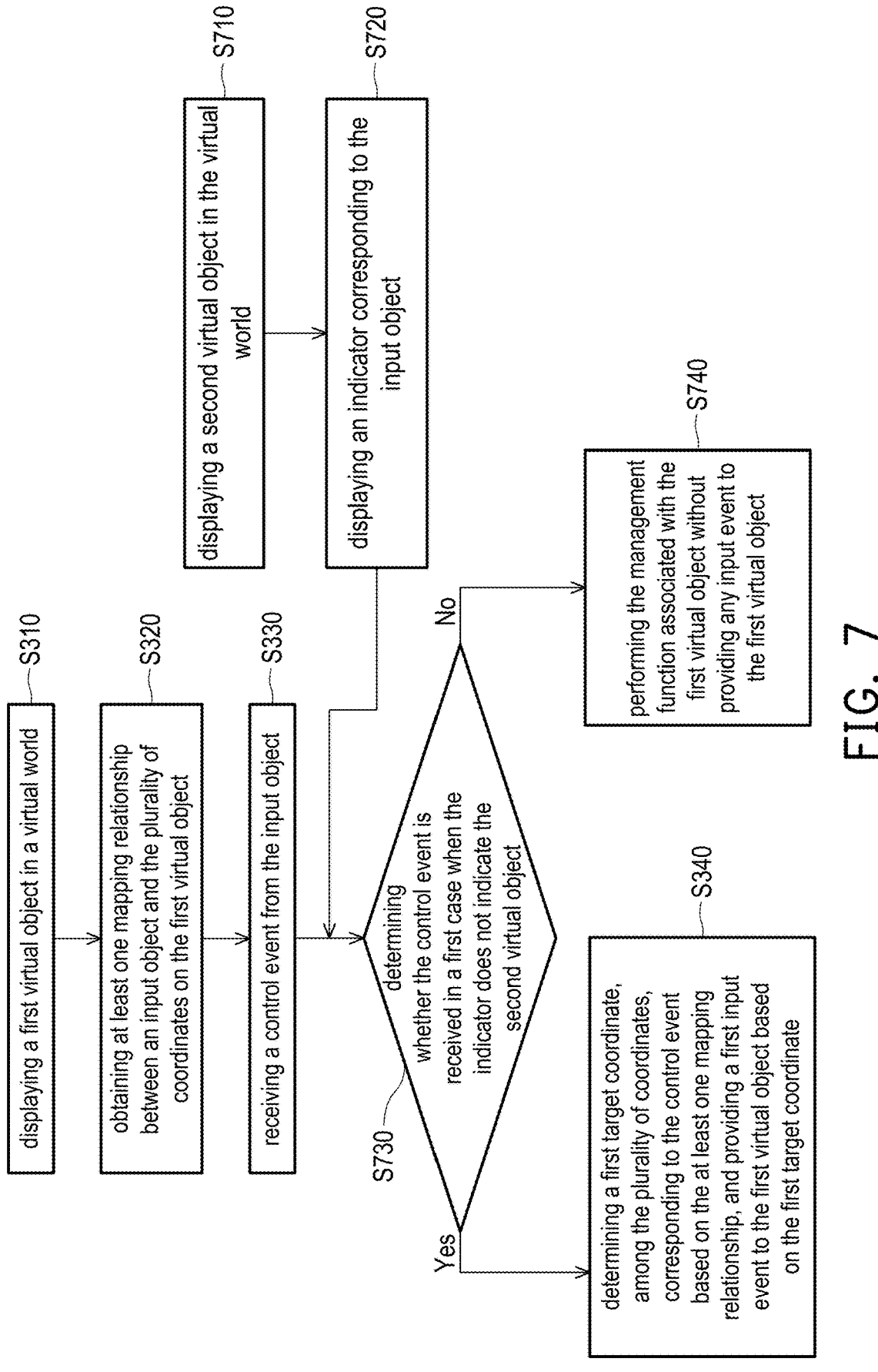

displaying a first virtual object in a virtual world —— S310 obtaining at least one mapping relationship between an input object and the plurality of coordinates on the first virtual object —— S320 receiving a control event from the input object —— S330 displaying a second virtual object in the virtual world —— S710 displaying an indicator corresponding to the input object —— S720

S730 — determining whether the control event is received in a first case when the indicator does not indicate the second virtual object No → performing the management function associated with the first virtual object without providing any input event to the first virtual object —— S740

Yes → determining a first target coordinate, among the plurality of coordinates, corresponding to the control event based on the at least one mapping relationship, and providing a first input event to the first virtual object based on the first target coordinate —— S340

FIG. 7

METHOD FOR PROVIDING INPUT EVENT TO VIRTUAL OBJECT, HOST, AND COMPUTER READABLE STORAGE MEDIUM

CROSS-REFERENCE TO RELATED APPLICATION

This application claims the priority benefit of U.S. provisional application Ser. No. 63/610,405, filed on Dec. 15, 2023. The entirety of the above-mentioned patent application is hereby incorporated by reference herein and made a part of this specification.

BACKGROUND

1. Field of the Invention

The present disclosure generally relates to a mechanism for providing a reality service, in particular, to a method for providing an input event to a virtual object, a host, and a computer readable storage medium.

2. Description of Related Art

In order to enable users to utilize existing applications on virtual reality (VR) or augmented reality (AR) devices, the interfaces of existing 2D applications or other streaming sources (such as PCs or smartphones) are provided in a form of a 2D panel (e.g., 2D window) within the virtual environment (e.g., the VR world). However, the associated operations are not as intuitively convenient as the original usage on mobile devices or PCs.

See FIG. 1, which shows a conventional way of interacting with the 2D window in the virtual environment. In FIG. 1, the user 19 may wear a head-mounted display (HMD) to experience the reality service provided by the HMD 10.

In the exemplary scenario of FIG. 1, the HMD 10 may be assumed to provide VR service. In this case, the HMD 10 may render the corresponding virtual world 11 (e.g., the VR world) for the user 19 to see.

In the case where the HMD 10 is connected with other electronic devices (e.g., a computer and/or smart devices), the HMD 10 may display a 2D window 12 in the virtual world 11, wherein the 2D window 12 may be mirroring the screen of the considered electronic device.

In FIG. 1, it is assumed that the 2D window 12 shows an application (e.g., an android game application) currently run on the electronic device, wherein the application may be designed with some control areas 12a (e.g., a virtual joystick) and/or 12b (e.g., a virtual button), and the user 19 may use the handheld controllers 13a and 13b (e.g., VR controllers) to interact with the application via the virtual world 11.

Specifically, the HMD 10 may display raycasts 14a and 14b respectively corresponding to the handheld controllers 13a and 13b, and the user 19 may use the raycasts 14a and 14b to interact with the application.

For example, if the user 19 intends to trigger the control area 12b, the user 19 may use the raycast 14b to aim at the control area 12b via moving the handheld controller 13b, and the user 19 may press, for example, a physical button on the handheld controller 13b. In this case, the HMD 10 may determine the position indicated/pointed by the raycast 14b in the virtual world 11 and accordingly determine the corresponding 2D coordinate to the application based on, for example, the dimension/resolution associated with the 2D window 12. Afterwards, the HMD 10 may determine that an input event has occurred on the determined 2D coordinate, and the HMD 10 may provide this input event to the application for the application to react in response to the input of the user 19.

Likewise, the user 19 may control the control area 12a by using the raycast 12a to do, for example, some dragging operations, and the associated input events would also be provided to the application for the application to react.

In some cases, the application may also be run on the HMD 10 itself, and the HMD can still show the same content as in FIG. 1, such that the user 19 can interact with the application in the way discussed in the above.

However, the user 19 needs to perform lots of aiming in the scenario of FIG. 1, the user 19 may feel tired and inconvenient when interacting with the virtual world 11.

SUMMARY OF THE INVENTION

Accordingly, the disclosure is directed to a method for providing an input event to a virtual object, a host, and a computer readable storage medium, which may be used to solve the above technical problems.

The embodiments of the disclosure provide a method for providing an input event to a virtual object, applied to a host. The method includes: displaying, by the host, a first virtual object in a virtual world, wherein the first virtual object includes a plurality of coordinates; obtaining, by the host, at least one mapping relationship between control events of an input object and the plurality of coordinates on the first virtual object; receiving, by the host, a control event from the input object; determining, by the host, a first target coordinate, among the plurality of coordinates, corresponding to the control event based on the at least one mapping relationship, and providing a first input event to the first virtual object based on the first target coordinate, wherein the first input event corresponds to the control event from the input object.

The embodiments of the disclosure provide a host including a storage circuit and a processor. The storage circuit stores a program code. The processor is coupled to the storage circuit and accesses the program code to perform: displaying a first virtual object in a virtual world, wherein the first virtual object includes a plurality of coordinates; obtaining at least one mapping relationship between control events of an input object and the plurality of coordinates on the first virtual object; receiving a control event from the input object; determining a first target coordinate, among the plurality of coordinates, corresponding to the control event based on the at least one mapping relationship, and providing a first input event to the first virtual object based on the first target coordinate, wherein the first input event corresponds to the control event from the input object.

The embodiments of the disclosure provide a computer readable storage medium, the computer readable storage medium recording an executable computer program, the executable computer program being loaded by a host to perform steps of: displaying a first virtual object in a virtual world, wherein the first virtual object includes a plurality of coordinates; obtaining at least one mapping relationship between control events of an input object and the plurality of coordinates on the first virtual object; receiving a control event from the input object; and determining a first target coordinate, among the plurality of coordinates, corresponding to the control event based on the at least one mapping relationship, and providing a first input event to the first virtual object based on the first target coordinate, wherein the first input event corresponds to the control event from the input object.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

FIG. 7 shows a flow chart of the method for providing an input event to a virtual object according to an embodiment of the disclosure.

DESCRIPTION OF THE EMBODIMENTS

Figure 1:
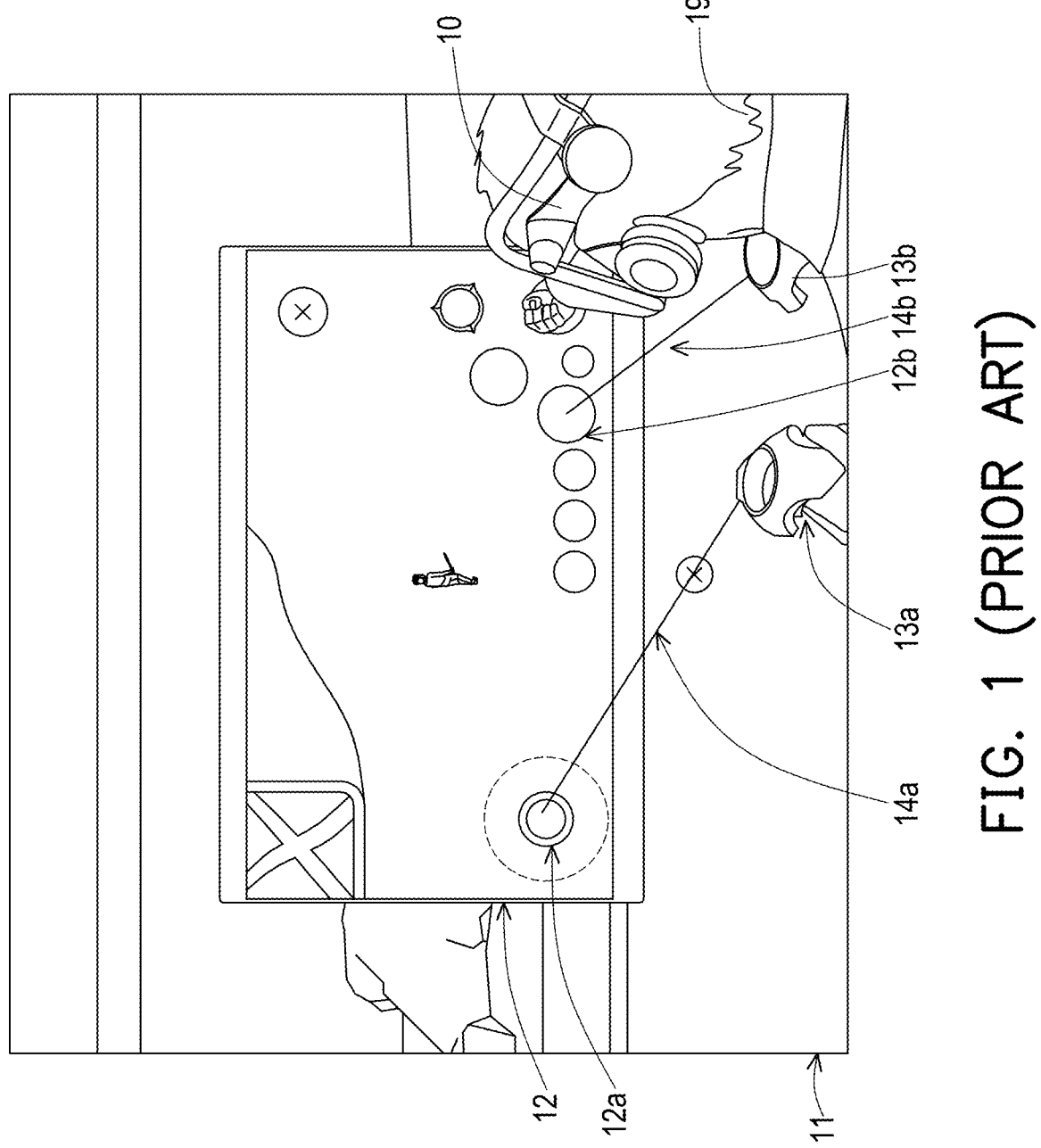
FIG. 1 shows a conventional way of interacting with the 2D window in the virtual environment.

Reference will now be made in detail to the present preferred embodiments of the invention, examples of which are illustrated in the accompanying drawings. Wherever possible, the same reference numbers are used in the drawings and the description to refer to the same or like parts.

Figure 2:
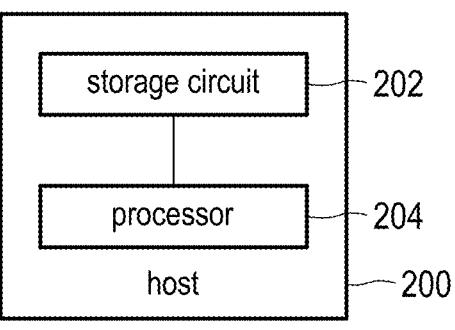
FIG. 2 shows a schematic diagram of a host according to an embodiment of the disclosure.

See FIG. 2, which shows a schematic diagram of a host according to an embodiment of the disclosure. In various embodiments, the host 200 can be any smart device and/or computer device that can provide visual contents of reality services such as virtual reality (VR) service, augmented reality (AR) services, mixed reality (MR) services, and/or extended reality (XR) services, but the disclosure is not limited thereto. In some embodiments, the host 200 can be a head-mounted display (HMD) capable of showing/providing visual contents (e.g., MR/XR/AR/VR contents) for the wearer/user to see. For better understanding the concept of the disclosure, the host 200 would be assumed to be an VR device (e.g., a VR HMD such as the HMD 10) for providing VR contents for the user to see, but the disclosure is not limited thereto.

In one embodiment, the host 200 can be disposed with built-in displays for showing the VR contents for the user to see. Additionally or alternatively, the host 200 may be connected with one or more external displays, and the host 200 may transmit the VR contents to the external display(s) for the external display(s) to display the VR contents, but the disclosure is not limited thereto.

In some embodiments, the host 200 can be disposed with some tracking engines for tracking one or more trackable objects, such as handheld controllers (e.g., VR controllers), wearable devices, hand gestures, and/or any other trackers, but the disclosure is not limited thereto.

4

In some embodiments, the host 200 can be designed to track the trackable objects by using, for example, inside-out and/or outside-in tracking mechanism, such as simultaneous localization and mapping (SLAM) and/or Lighthouse, but the disclosure is not limited thereto.

In FIG. 2, the host 200 includes a storage circuit 202 and a processor 204. The storage circuit 202 is one or a combination of a stationary or mobile random access memory (RAM), read-only memory (ROM), flash memory, hard disk, or any other similar device, and which records a plurality of modules and/or a program code that can be executed by the processor 204.

The processor 204 may be coupled with the storage circuit 202, and the processor 204 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 204 may access the modules and/or the program code stored in the storage circuit 202 to implement the method for providing an input event to a virtual object provided in the disclosure, which would be further discussed in the following.

Figure 3:
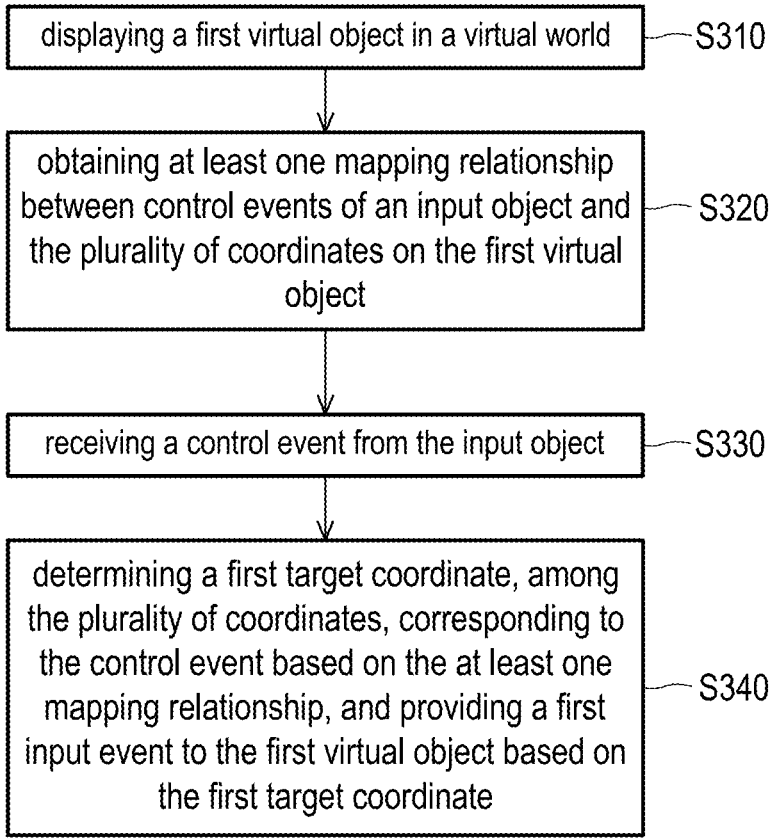
FIG. 3 shows a flow chart of the method for providing an input event to a virtual object according to an embodiment of the disclosure.
Figure 4:
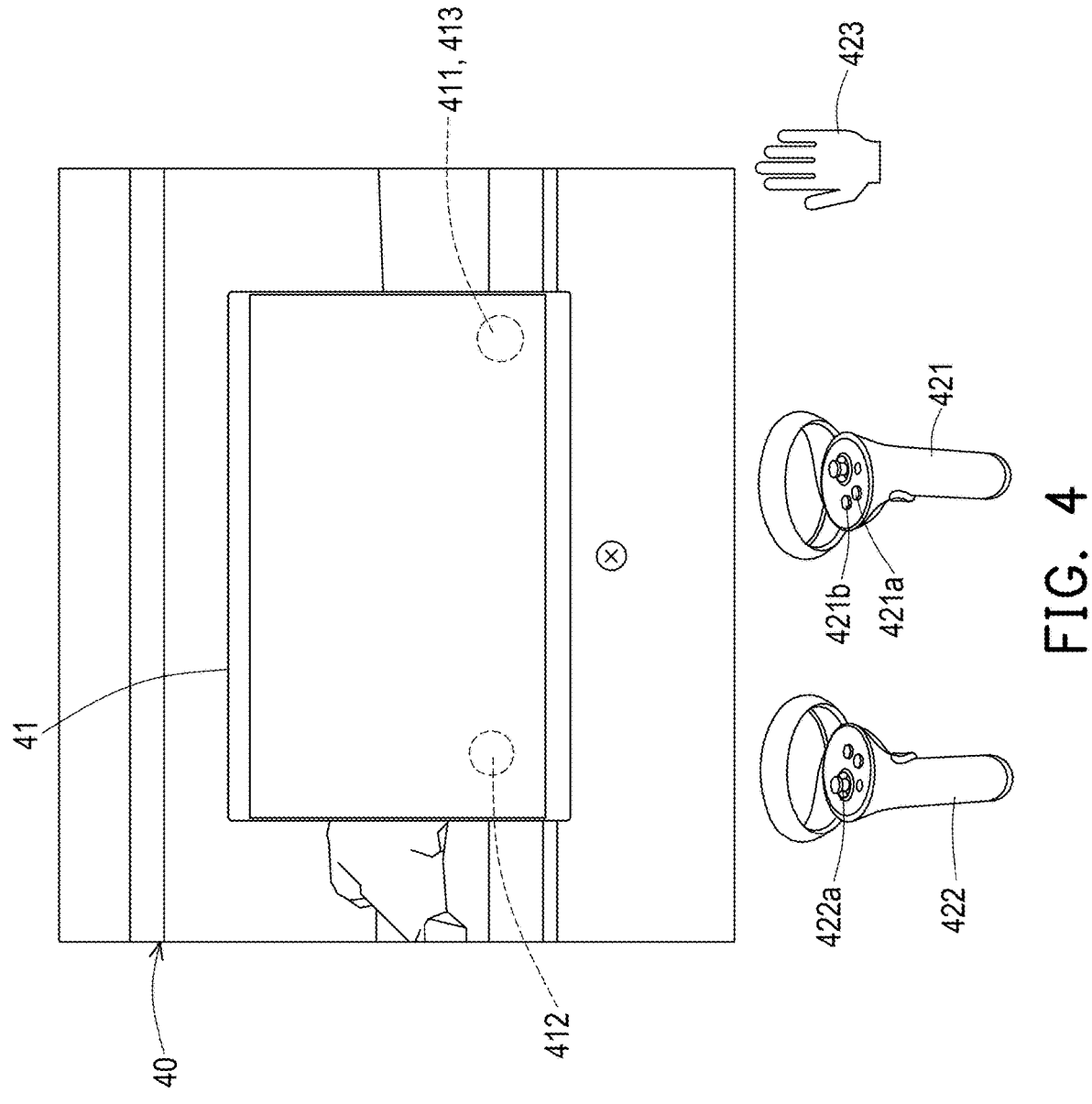
FIG. 4 shows a schematic diagram of an application scenario according to an embodiment of the disclosure.

See FIG. 3, which shows a flow chart of the method for providing an input event to a virtual object according to an embodiment of the disclosure. The method of this embodiment may be executed by the host 200 in FIG. 2, and the details of each step in FIG. 3 will be described below with the components shown in FIG. 2. In addition, for better understanding, FIG. 4 would be used as an example, wherein FIG. 4 shows a schematic diagram of an application scenario according to an embodiment of the disclosure.

In step S310, the processor 204 displays a first virtual object 41 in a virtual world 40. In the embodiment, the virtual world 40 may be a 3D virtual environment of a reality service provided by the host 200, such as a VR world, but the disclosure is not limited thereto. In various embodiments, the first virtual object 41 may be a 2D window, wherein the 2D window may be used to show some 2D contents.

In one embodiment, the host 200 may be used to run an application corresponding to mobile operating systems (e.g., android/iOS applications), and the associated contents may be displayed in the 2D window. For example, if the host 200 is used to execute an android application, the associated visual contents (e.g., a 2D visual content) of the android application can be additionally displayed within the 2D window, but the disclosure is not limited thereto.

In one embodiment, the host 200 may be connected with an electronic device (e.g., an external computer and/or smart devices), wherein this electronic device may be used to run the above application (e.g., the android application).

In this case, the processor 204 may receive a screen stream from the electronic device running the application and render a 2D visual content according to the screen stream. Next, the processor 204 may display the rendered 2D visual content within the 2D window.

In the embodiment of the disclosure, the 2D window and the 2D visual contents displayed therein may be regarded as different virtual objects, but the disclosure is not limited thereto.

In one embodiment, the first virtual object 41 includes a plurality of coordinates. In one embodiment, the plurality of coordinates of the first virtual object 41 may include a plurality of 2D coordinates within the 2D window.

For example, if the resolution of the 2D window in the virtual world 40 is W×H, the 2D window may be assumed to have W×H of 2D coordinates therein, and the corresponding 3D coordinates of these 2D coordinates in the virtual world 40 can be derived based on the position/height/width of the 2D window in the virtual world 40.

In step S320, the processor 204 obtains at least one mapping relationship between control events of an input object and the plurality of coordinates on the first virtual object 41.

In various embodiments, the considered input object may be the object used by the user to perform input operations to the host 200, such as handheld controllers and/or the user's hand, but the disclosure is not limited thereto.

In a first embodiment, the input object may be the handheld controller 421 having a physical button 421a, and the mapping relationship may include a first mapping relationship between the control even corresponding to the physical button 421a and a first coordinate 411 among the plurality of coordinates.

In a second embodiment, the input object may be the handheld controller 422 having a joystick 422a, the joystick 422a has a default position on the handheld controller 422, and the mapping relationship may include a second mapping relationship between the control event corresponding to the default position of the joystick 422a and a second coordinate 412 among the plurality of coordinates.

In a third embodiment, the input object may be the hand 423 of the user of the host 200, and the mapping relationship may include a third mapping relationship between the control event corresponding to a first hand gesture (e.g., a pinch gesture, a pinch-and-hold gesture, a first gesture, a palm gesture, etc.) and a third coordinate among the plurality of coordinates.

In some embodiments where the first virtual object 41 (e.g., the 2D window) is used to show the application (e.g., the application exemplarily shown in FIG. 1), since the application may be designed with some controllable objects (e.g., the virtual joystick/button), the mapping relationship between the control events of the input object and the plurality of coordinates on the first virtual object 41 can be accordingly determined.

For example, it may be assumed in the first embodiment that there would be a first controllable object (e.g., a virtual button) at the first coordinate 411 when the application is shown within the 2D window, the first mapping relationship can be accordingly established if the physical button 421a is designed/assigned to trigger the first controllable object.

For another example, it may be assumed that in the second embodiment that there would be a second controllable object (e.g., a virtual joystick) at the second coordinate 412 when the application is shown within the 2D window, the second mapping relationship can be accordingly established if the joystick 422a is designed/assigned to control the second controllable object.

For yet another example, it may be assumed that in the third embodiment that there would be a third controllable object (e.g., a virtual button) at the third coordinate 413 when the application is shown within the 2D window, the third mapping relationship can be accordingly established if the first hand gesture is designed/assigned to trigger the third controllable object, but the disclosure is not limited thereto. In FIG. 4, the third coordinate 413 may be the same as the first coordinate 411, and the third controllable object may be the same as the first controllable object, which allows the user to trigger the same controllable object by using the handheld controller 421 and/or the hand.

In other embodiments, the third coordinate 413 may be the different from the first coordinate 411, and the third controllable object may be the same or different from the first controllable object, but the disclosure is not limited thereto.

In the embodiments of the disclosure, in the process of establishing a mapping relationship, the processor 204 may need the user to use the input object to generate a control event (e.g., pressing keys, doing hand gestures, moving joysticks, etc.) and choose the coordinate to be mapped to the control event. In this case, the processor 204 can accordingly establish the mapping relationship between the generated control event and the associated coordinate.

For example, when establishing the first mapping relationship, the user may press the physical button 421a to generate the associated control event and choose the first coordinate 411 by, for example, using the raycast to point to the first coordinate 411. In this case, the processor 204 may accordingly establish the first mapping relationship between the control even corresponding to the physical button 421a and the first coordinate 411.

For another example, when establishing the third mapping relationship, the user may do the first hand gesture to generate the associated control event and choose the third coordinate by, for example, using the raycast to point to the third coordinate. In this case, the processor 204 may accordingly establish the third mapping relationship between the control even corresponding to the first hand gesture and the third coordinate.

In step S330, the processor 204 receives a control event from the input object. In the embodiments where the input object is assumed to be a handheld controller, the handheld controller may transmit a control event when, for example, a certain physical button thereon is triggered (e.g., pressed, pressed-and-held, etc.). In this case, the control event may indicate that the certain physical button has been triggered.

In addition, the handheld controller may also transmit a control event when, for example, the joystick thereon is being pushed toward a direction. In this case, the control event may indicate that the joystick has been pushed toward the direction.

In some embodiments, since the handheld controller may detect the pose/movement thereof, the handheld controller may further provide the detected pose/movement in the control event. For example, if the handheld controller determines that the body thereof has been moved toward a first direction while a certain physical button is being pressed and held, the handheld controller may provide the corresponding control event to the host 200 for indicating this situation, but the disclosure is not limited thereto.

In the embodiments where the input object is assumed to be the hand, the processor 204 may determine that a control event has been received from the input object when, for example, the processor 204 determines that the hand has performed some specific hand gestures (e.g., the first hand gesture), but the disclosure is not limited thereto. In some embodiments, one or more of the specific gestures may be designed to characterize some operations corresponding to the operations might be performed on the handheld controller, such as key pressing, key clicking, joystick being pushed toward a certain direction, etc.

In some embodiments, since the host 200 may detect the pose/movement of the hand of the user, the processor 204 may determine that a control event has been received from the input object when, for example, the processor 204 determines that the hand has been moved toward a direction while maintaining some specific hand gesture.

In step S340, the processor 204 determines a first target coordinate, among the plurality of coordinates, corresponding to the control event based on the at least one mapping relationship, and provides a first input event to the first virtual object 41 based on the first target coordinate. In the embodiments of the disclosure, the first input event corresponds to the control event from the input object. Alternatively or additionally, the first input event may be used to control the controllable object associated with the first target coordinate, but the disclosure is not limited thereto.

Figure 5A:
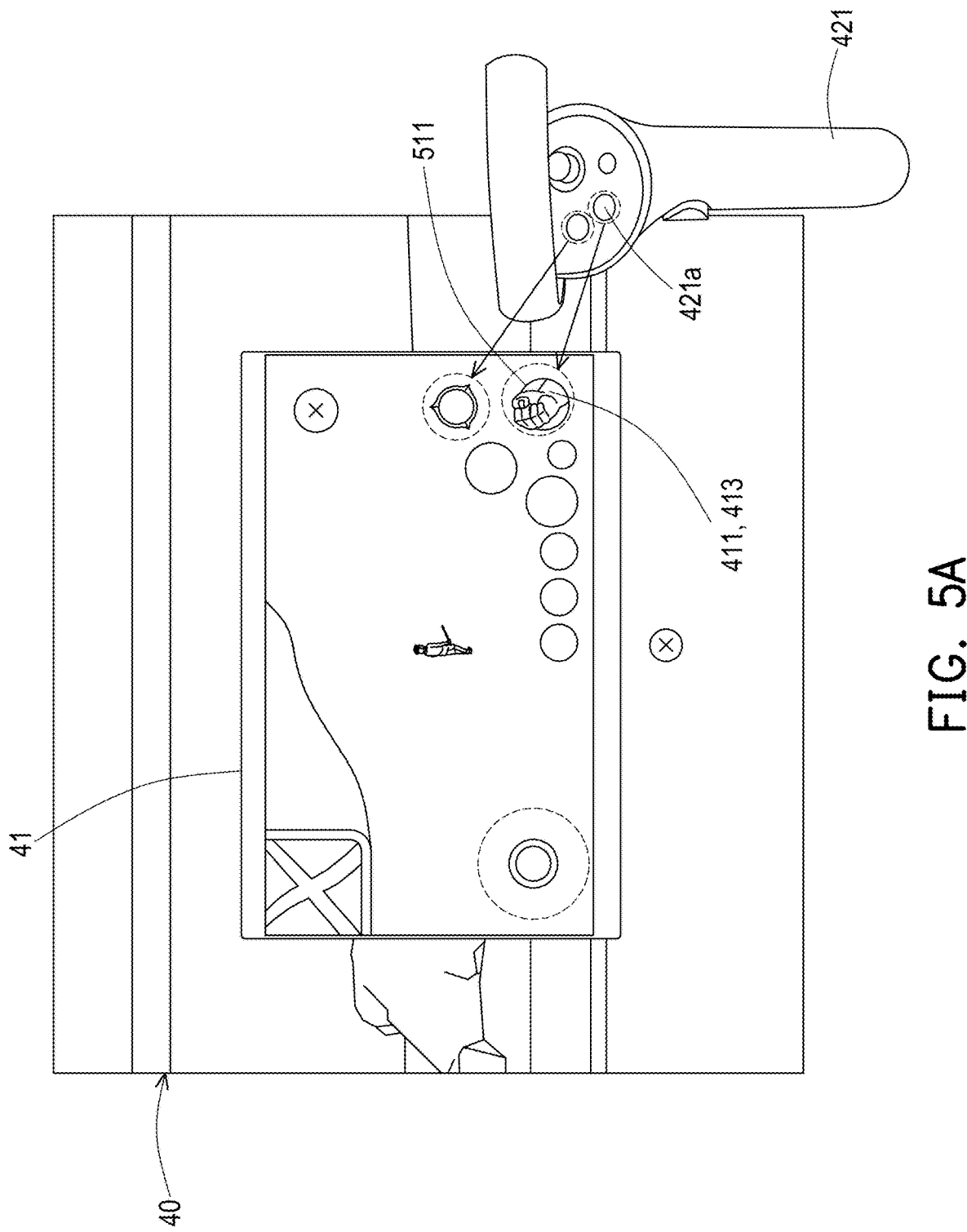
FIG. 5A shows an application scenario according to the first embodiment of the disclosure.

See FIG. 5A, which shows an application scenario according to the first embodiment of the disclosure. In the first embodiment, in response to determining that the control event indicates that the physical button 421a has been triggered, the processor 204 determines the first coordinate 411 as the first target coordinate, and accordingly provide the first input event to the first virtual object 41, wherein the first input event is a triggering event on the first coordinate 411.

In the first embodiment, if the control event is received when the application is being shown within the 2D window (wherein the first controllable object 511 is shown at the position corresponding to the first coordinate 411), the first input event (e.g., the triggering event on the first coordinate 411) may correspondingly be used to trigger the first controllable object 511 (e.g., a virtual button) in the application, such that the application would react in response to the first input event.

Figure 5B:
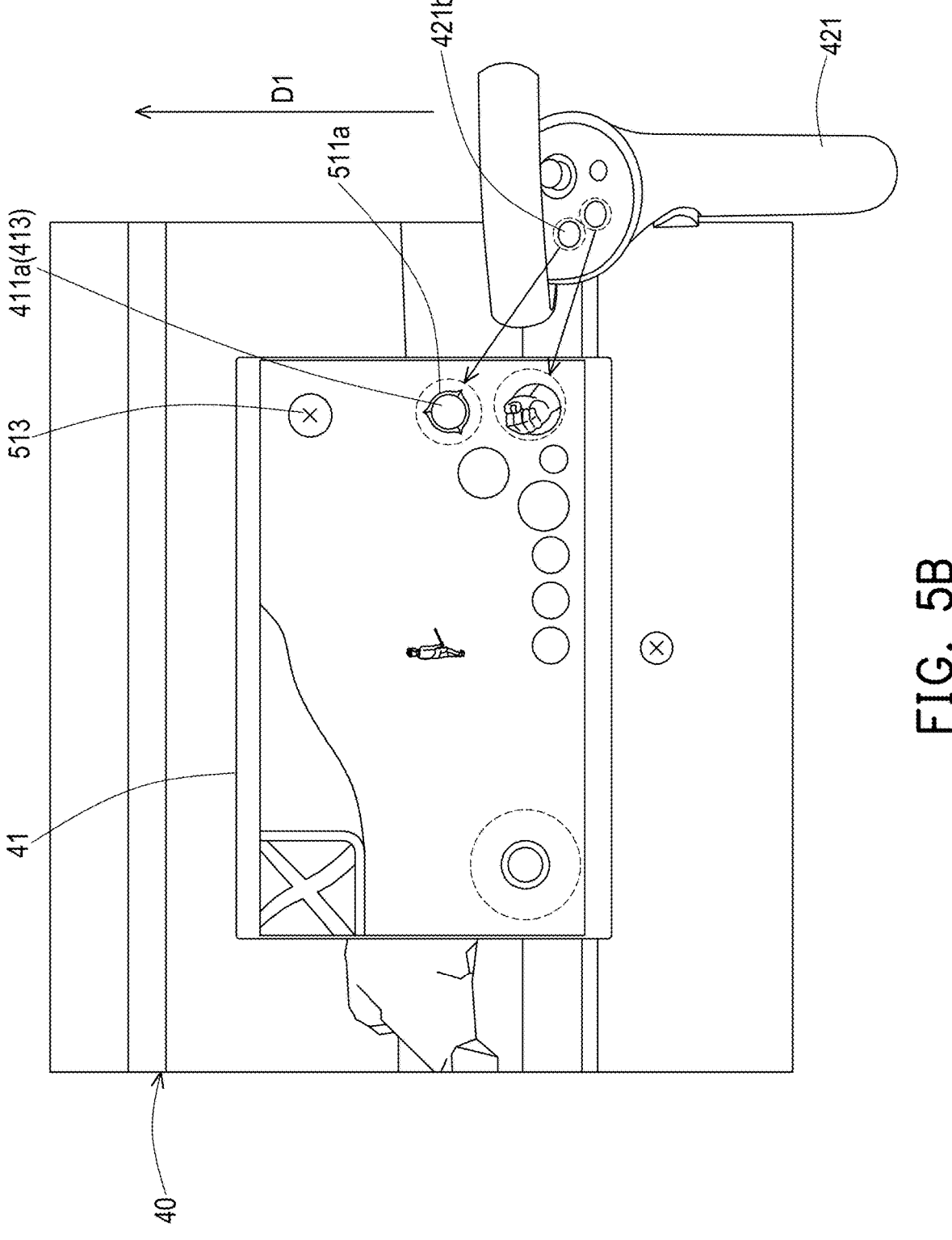
FIG. 5B shows another application scenario according to the first embodiment of the disclosure.

See FIG. 5B, which shows another application scenario according to the first embodiment of the disclosure. In FIG. 5B, it may be further assumed that the physical button 421b on the handheld controller 421 is designed with a corresponding mapping relationship with the coordinate 411a, wherein a controllable object 511a (e.g., a virtual joystick) may be shown at the coordinate 411a when the application is shown within the 2D window.

In this case, in response to determining that the control event (referred to a specific control event) indicates that the body of the handheld controller 421 has been moved toward a first direction D1 while the physical button 421b is being pressed and held, the processor 204 determines the coordinate 411a as the first target coordinate, and accordingly provide the first input event to the first virtual object 41, wherein the first input event is a dragging event originates from the coordinate 411a, and a dragging direction of the dragging event corresponds to the first direction D1.

In FIG. 5B, if the specific control event is received when the application is being shown within the 2D window (i.e., the controllable object 511a is shown at the position corresponding to the coordinate 411a), the first input event (e.g., the dragging event originating from the coordinate 411a) may correspondingly be used to drag the controllable object 511a (e.g., a virtual joystick) in the application, such that the application would react in response to the first input event.

In addition, in response to determining that the dragging event ends at a second target coordinate corresponds to a particular function, the processor 204 may accordingly provide a second input event to the first virtual object 41, wherein the second input event triggers the particular function.

For example, the controllable object 511a may be designed with a particular function (e.g., a cancelling function indicated by the icon 513) when being dragged to the first direction D1. In this case, the processor 204 may determine whether the dragging event ends at the second target coordinate corresponding to the particular function.

In one embodiment, the processor 204 may determine whether the physical button 421b is released in the process of the controllable object 511a being substantially dragged toward the first direction D1 and/or toward the icon 513. If yes, the processor 204 may determine that the dragging event has been ended and determine the coordinate where the physical button 421b is released as the second target coordinate corresponding to the particular function. Next, the processor 204 may provide the corresponding second input event to the first virtual object 41, wherein the second input event triggers the particular function (e.g., a cancelling function indicated by the icon 513), but the disclosure is not limited thereto.

Figure 6:
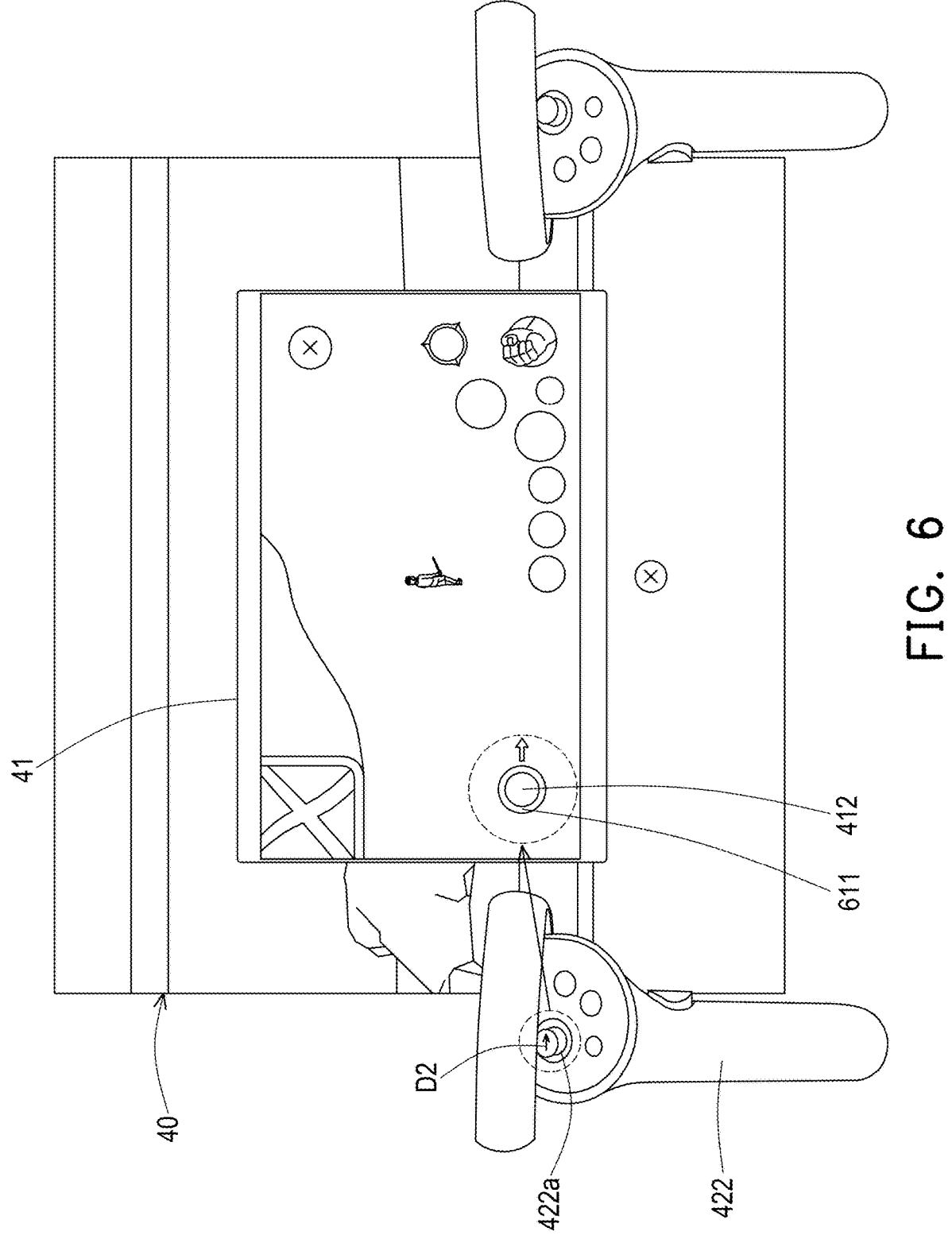
FIG. 6 shows an application scenario according to the second embodiment of the disclosure.

See FIG. 6, which shows an application scenario according to the second embodiment of the disclosure. In the second embodiment, in response to determining that the joystick 422a has been pushed toward a second direction D2, the processor 204 determines the second coordinate 412 as the first target coordinate, and accordingly provide the first input event to the first virtual object 41, wherein the first input event is a dragging event originates from the second coordinate 412, and a dragging direction of the dragging event corresponds to the second direction D2.

In the second embodiment, if the control event is received when the application is being shown within the 2D window (wherein the second controllable object 611 is shown at the position corresponding to the second coordinate 412), the first input event (e.g., the dragging event originating from the second coordinate 412) may correspondingly be used to control (e.g., drag) the second controllable object 611 (e.g., a virtual joystick) in the application, such that the application would react in response to the first input event.

In the third embodiment where the input object is assumed to be the hand 423 of the user, the operations discussed in FIG. 5A, FIG. 5B, and FIG. 6 can be implemented in a similar way.

In one embodiment, in response to determining that the control event indicates that the hand 423 has been changed to the first hand gesture (e.g., a first gesture), the processor 204 may determine the third coordinate 413 as the first target coordinate, and accordingly provide the first input event to the first virtual object 41, wherein the first input event is a triggering event on the third coordinate 413.

In the scenario exemplarily shown in FIG. 4 and FIG. 5A, since the third coordinate 413 is assumed to be the same as the first coordinate 411, the first input event (e.g., the triggering event on the third coordinate 413) may correspondingly be used to trigger the first controllable object 511 (e.g., a virtual button) in the application, such that the application would react in response to the first input event.

In one embodiment, in response to determining that the control event indicates that the hand 423 has been moved toward the first direction D1 while maintaining the first hand gesture, the processor 204 may determine the third coordinate 413 as the first target coordinate, and accordingly provide the first input event to the first virtual object 41, wherein the first input event is a dragging event originates from the third coordinate 413, and a dragging direction of the dragging event corresponds to the first direction D1.

For better understanding, the considered third coordinate 413 may be alternatively assumed to be the same as the coordinate 411a in FIG. 5B. In this case, the processor 204 determines the third coordinate 413 as the first target coordinate, and accordingly provide the first input event to the first virtual object 41, wherein the first input event is a dragging event originates from the third coordinate 413 in FIG. 5B, and a dragging direction of the dragging event corresponds to the first direction D1.

In this case, the first input event (e.g., the dragging event originating from the third coordinate 413) may correspondingly be used to drag the controllable object 511a (e.g., a virtual joystick) in the application, such that the application would react in response to the first input event.

In addition, in response to determining that the dragging event ends at a second target coordinate corresponds to a particular function, the processor 204 may accordingly provide a second input event to the first virtual object 41, wherein the second input event triggers the particular function.

For example, the controllable object 511a may be designed with a particular function (e.g., a cancelling function indicated by the icon 513) when being dragged to the first direction D1. In this case, the processor 204 may determine whether the dragging event ends at the second target coordinate corresponding to the particular function.

In one embodiment, the processor 204 may determine whether the hand 423 is changed from the first hand gesture to another hand gesture in the process of the controllable object 511a being substantially dragged toward the first direction D1 and/or toward the icon 513. If yes, the processor 204 may determine that the dragging event has been ended and determine the coordinate where the gesture of the hand is changed as the second target coordinate corresponding to the particular function. Next, the processor 204 may provide the corresponding second input event to the first virtual object 41, wherein the second input event triggers the particular function (e.g., a cancelling function indicated by the icon 513), but the disclosure is not limited thereto.

See FIG. 7, which shows a flow chart of the method for providing an input event to a virtual object according to an embodiment of the disclosure. The method of this embodiment may be executed by the host 200 in FIG. 2, and the details of each step in FIG. 3 will be described below with the components shown in FIG. 2. In addition, for better understanding, FIG. 8 would be used as an example, wherein FIG. 8 shows a schematic diagram of an application scenario according to an embodiment of the disclosure.

In FIG. 7, the processor 204 may perform steps S310 to S330 in FIG. 3, and the associated details may be referred to the above descriptions.

In the embodiment, the processor 204 may further perform step S710 to display a second virtual object 82 in the virtual world 40, wherein the second virtual object 82 provides a management function associated with the first virtual object 41.

Figure 8:
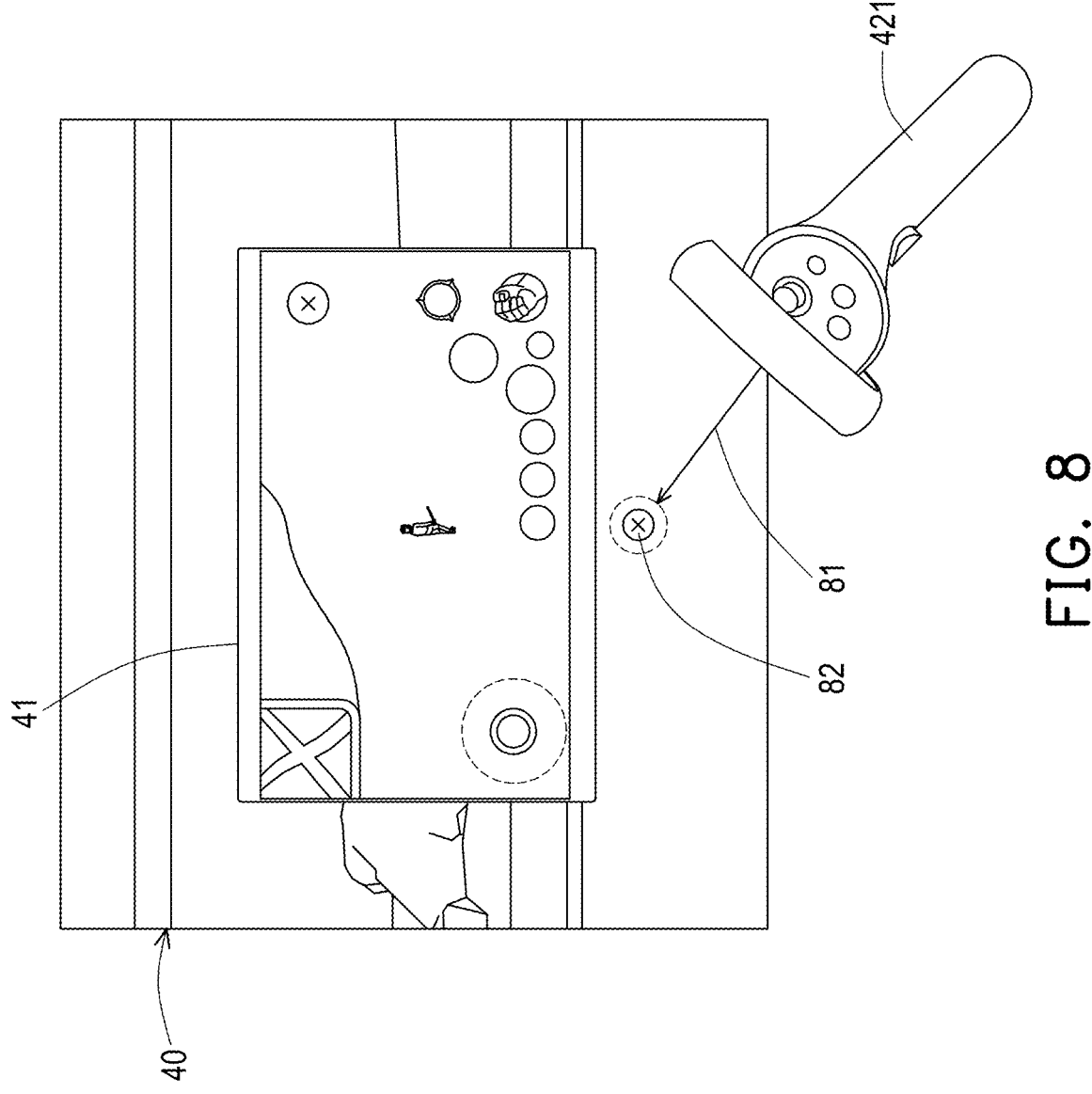
FIG. 8 shows a schematic diagram of an application scenario according to an embodiment of the disclosure.

In FIG. 8, the management function provided by the second virtual object 82 may be cancelling the first virtual object 41, but the disclosure is not limited thereto.

In step S720, the processor 204 displays an indicator 81 corresponding to the input object. In FIG. 8, the input object may be assumed to be the handheld controller 421, and the indicator 81 corresponding thereto may be, for example, the raycast corresponding to the handheld controller 421, but the disclosure is not limited thereto.

In step S730, the processor 204 determines whether the control event is received when the indicator 81 does not indicate the second virtual object 82.

In one embodiment, in response to determining that the control event is received in a first case where the indicator 81 does not indicate the second virtual object 82 (e.g., not pointing to the second virtual object 82), the processor 104 may perform step S340 accordingly, and the associated details may be referred to the above descriptions.

On the other hand, in response to determining that the control event is received in a second case where the indicator 81 is indicating the second virtual object 82 (e.g., pointing to the second virtual object 82), the processor 204 may perform, in step S740, the management function associated with the first virtual object 41 without providing any input event to the first virtual object 41. For example, if the control event is received when the indicator 81 is pointing to the second virtual object 82, the processor 204 may directly cancel the first virtual object 41 by, for example, closing the 2D window, but the disclosure is not limited thereto.

The disclosure further provides a computer readable storage medium for executing the method for providing an input event to a virtual object. The computer readable storage medium is composed of a plurality of program instructions (for example, a setting program instruction and a deployment program instruction) embodied therein. These program instructions can be loaded into the host 200 and executed by the same to execute the method for providing an input event to a virtual object and the functions of the host 200 described above.

In summary, the embodiments of the disclosure provide a solution for the user to interact with the virtual objects (e.g., 2D window) in a more convenient way, such that the user experience may be improved.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for providing an input event to a virtual object, applied to a host, comprising:

displaying, by the host, a first virtual object in a virtual world, wherein the first virtual object comprises a plurality of coordinates;

establishing, by the host, at least one mapping relationship between control events of an input object and the plurality of coordinates on the first virtual object, wherein the process of establishing the at least one mapping relationship includes detecting a control event generated by a user using the input object on the first virtual object, detecting a first target coordinate among the plurality of coordinates, and establishing the at least one mapping relationship between the control event of the input object and the first target coordinate;

receiving, by the host, the control event from the input object;

in response to receiving the control event of the input object, determining, by the host, the first target coordinate mapped to the control event, among the plurality of coordinates, based on the at least one mapping relationship; and providing a first input event to the first virtual object based on the first target coordinate, wherein the first input event corresponds to the control event from the input object.

2. The method according to claim 1, wherein the input object comprises a handheld controller having a physical button, and the at least one mapping relationship comprises a first mapping relationship between the physical button and a first coordinate among the plurality of coordinates, and the method comprises:

in response to determining that the control event indicates that the physical button has been triggered, determining the first coordinate as the first target coordinate, and accordingly providing the first input event to the first virtual object, wherein the first input event is a triggering event on the first coordinate.

3. The method according to claim 1, wherein the input object comprises a handheld controller having a physical button, and the at least one mapping relationship comprises a first mapping relationship between the physical button and a first coordinate among the plurality of coordinates, and the method comprises:

in response to determining that the control event indicates that a body of the handheld controller has been moved toward a first direction while the physical button is being pressed and held, determining the first coordinate as the first target coordinate, and accordingly providing the first input event to the first virtual object, wherein the first input event is a dragging event originates from the first coordinate, and a dragging direction of the dragging event corresponds to the first direction.

4. The method according to claim 3, further comprising:

in response to determining that the dragging event ends at a second target coordinate corresponding to a function, accordingly providing a second input event to the first virtual object, wherein the second input event triggers the function.

5. The method according to claim 1, wherein the input object comprises a handheld controller having a joystick, the joystick has a default position on the handheld controller, and the at least one mapping relationship comprises a second mapping relationship between the default position of the joystick and a second coordinate among the plurality of coordinates, and the method comprises:

in response to determining that the control event indicates that the joystick has been pushed toward a second direction, determining the second coordinate as the first target coordinate, and accordingly providing the first input event to the first virtual object, wherein the first input event is a dragging event originates from the second coordinate, and a dragging direction of the dragging event corresponds to the second direction.

6. The method according to claim 1, wherein the input object comprises a hand, and the at least one mapping relationship comprises a third mapping relationship between a first hand gesture and a third coordinate among the plurality of coordinates, and the method comprises:

in response to determining that the control event indicates that the hand has been changed to the first hand gesture, determining the third coordinate as the first target coordinate, and accordingly providing the first input event to the first virtual object, wherein the first input event is a triggering event on the third coordinate.

7. The method according to claim 1, wherein the input object comprises a hand, and the at least one mapping relationship comprises a third mapping relationship between a first hand gesture and a third coordinate among the plurality of coordinates, and the method comprises:

in response to determining that the control event indicates that the hand has been moved toward a first direction while maintaining the first hand gesture, determining the third coordinate as the first target coordinate, and accordingly providing the first input event to the first virtual object, wherein the first input event is a dragging event originates from the third coordinate, and a dragging direction of the dragging event corresponds to the first direction.

8. The method according to claim 7, further comprising:

in response to determining that the dragging event ends at a second target coordinate corresponding to a function, accordingly providing a second input event to the first virtual object, wherein the second input event triggers the function.

9. The method according to claim 1, further comprising:

displaying a second virtual object in the virtual world, wherein the second virtual object provides a management function associated with the first virtual object;

displaying an indicator corresponding to the input object;

in response to determining that the control event is received in a first case where the indicator does not indicate the second virtual object, determining the first target coordinate corresponding to the control event based on the at least one mapping relationship, and providing the first input event to the first virtual object based on the first target coordinate.

10. The method according to claim 9, further comprising:

in response to determining that the control event is received in a second case where the indicator is indicating the second virtual object, performing the management function associated with the first virtual object without providing any input event to the first virtual object.

11. The method according to claim 1, wherein the virtual world is a 3D virtual environment of a reality service provided by the host.

12. The method according to claim 1, wherein the first virtual object is a 2D window.

13. The method according to claim 12, further comprising:

receiving a screen stream from an electronic device running an application and rendering a 2D visual content according to the screen stream; and displaying the 2D visual content within the 2D window.

14. The method according to claim 12, wherein the plurality of coordinates of the first virtual object comprise a plurality of 2D coordinates within the 2D window.

15. The method according to claim 14, wherein the 2D window shows an application comprising at least one controllable object, and the at least one mapping relationship between the input object and the plurality of coordinates on the first virtual object are determined based on a 2D position of each of the at least one controllable object in the 2D window.

16. A host, comprising:

a non-transitory storage circuit, storing a program code; and a processor, coupled to the non-transitory storage circuit and accessing the program code to perform:

displaying a first virtual object in a virtual world, wherein the first virtual object comprises a plurality of coordinates;

establishing at least one mapping relationship between control events of an input object and the plurality of coordinates on the first virtual object, wherein the process of establishing the at least one mapping relationship includes detecting a control event generated by a user using the input object on the first virtual object, detecting a first target coordinate among the plurality of coordinates, and establishing the at least one mapping relationship between the control event and the first target coordinate;

receiving the control event from the input object;

in response to receiving the control event of the input object, determining the first target coordinate mapped to the control event, among the plurality of coordinates, based on the at least one mapping relationship; and providing a first input event to the first virtual object based on the first target coordinate, wherein the first input event corresponds to the control event from the input object.

17. The host according to claim 16, wherein the input object comprises a handheld controller having a physical button, and the at least one mapping relationship comprises a first mapping relationship between the physical button and a first coordinate among the plurality of coordinates, and the processor is configured to perform:

in response to determining that the control event indicates that the physical button has been triggered, determining the first coordinate as the first target coordinate, and accordingly providing the first input event to the first virtual object, wherein the first input event is a triggering event on the first coordinate.

18. The host according to claim 16, wherein the input object comprises a handheld controller having a physical button, and the at least one mapping relationship comprises a first mapping relationship between the physical button and a first coordinate among the plurality of coordinates, and the processor is configured to perform:

in response to determining that the control event indicates that a body of the handheld controller has been moved toward a first direction while the physical button is being pressed and held, determining the first coordinate as the first target coordinate, and accordingly providing the first input event to the first virtual object, wherein the first input event is a dragging event originates from the first coordinate, and a dragging direction of the dragging event corresponds to the first direction; and in response to determining that the dragging event ends at a second target coordinate among the plurality of coordinates, accordingly providing a second input event to the first virtual object, wherein the second input event is a triggering event on the second coordinate.

19. The host according to claim 16, wherein the input object comprises a handheld controller having a joystick, the joystick has a default position on the handheld controller, and the at least one mapping relationship comprises a second mapping relationship between the default position of the joystick and a second coordinate among the plurality of coordinates, and the processor is configured to perform:

in response to determining that the control event indicates that the joystick has been pushed toward a second direction, determining the second coordinate as the first target coordinate, and accordingly providing the first input event to the first virtual object, wherein the first input event is a dragging event originates from the second coordinate, and a dragging direction of the dragging event corresponds to the second direction.

20. A non-transitory computer readable storage medium, the computer readable storage medium recording an executable computer program, the executable computer program being loaded by a host to perform steps of:

displaying a first virtual object in a virtual world, wherein the first virtual object comprises a plurality of coordinates;

establishing at least one mapping relationship between control events of an input object and the plurality of coordinates on the first virtual object, wherein the process of establishing the at least one mapping relationship includes detecting a control event generated by a user using the input object on the first virtual object, detecting a first target coordinate among the plurality of coordinates, and establishing the at least one mapping relationship between the control event and the first target coordinate;

receiving the control event from the input object; and in response to receiving the control event of the input object, determining the first target coordinate mapped to the control event, among the plurality of coordinates, based on the at least one mapping relationship, and providing a first input event to the first virtual object based on the first target coordinate, wherein the first input event corresponds to the control event from the input object.

\* \* \* \* \*